United States Patent [19]

Hueber et al.

[11] 4,047,837
[45] Sept. 13, 1977

[54] TURBINE WHEEL HAVING INTERNALLY COOLED RIM AND RATED BREAKING POINTS

[75] Inventors: Alfred Hueber; Roland Buchs, both of Munich, Germany

[73] Assignee: Motoren- und Turbinen-Union Munchen GmbH, Munich, Germany

[21] Appl. No.: 523,787

[22] Filed: Nov. 14, 1974

[30] Foreign Application Priority Data

Nov. 16, 1973 Germany .............................. 2357326

[51] Int. Cl.² ........................... F01D 5/18; F02D 5/08
[52] U.S. Cl. ........................................ 416/95; 138/42; 416/193 A; 416/244 A
[58] Field of Search ................ 416/95, 244 A, 193 A; 138/42

[56] References Cited

U.S. PATENT DOCUMENTS

| | | | |
|---|---|---|---|
| 2,096,021 | 10/1937 | Aherne | 138/42 X |
| 3,262,676 | 7/1966 | Huebner, Jr. | 416/244 A X |
| 3,318,573 | 5/1967 | Matsuki | 416/95 |
| 3,370,830 | 2/1968 | Nickles | 416/95 X |
| 3,451,627 | 6/1969 | Barber | 138/42 X |
| 3,644,058 | 2/1972 | Barnabei | 416/95 |
| 3,728,042 | 4/1973 | Hugoson | 416/95 |
| 3,817,657 | 6/1974 | Hueber | 416/244 A |
| 3,824,036 | 7/1974 | Penny | 416/95 |
| 3,834,831 | 9/1974 | Mitchell | 416/95 |
| 3,836,279 | 9/1974 | Lee | 416/95 X |

FOREIGN PATENT DOCUMENTS 911,323  11/1962  United Kingdom ................. 138/42

Primary Examiner—Martin P. Schwadron
Assistant Examiner—Abraham Hershkovitz
Attorney, Agent, or Firm—Alan H. Levine

[57] ABSTRACT

A turbine wheel including blades and rim made in one piece, a notch in the peripheral surface of the rim between each two successive blades, and a through-hole in the rim radially inwardly of and parallel to each notch. The through-holes permit cooling air to flow from one side of the turbine wheel to the other. Each through hole is spaced closely to its respective notch to define a narrow rated breaking point between the two. The through-holes may be of circular, oval, or elliptical cross-sectional shape. A tubular baffle is arranged in each through-hole, the baffle being open at one end to receive cooling air, but the other end of the baffle being blocked. The wall of the baffle is perforated. Longitudinally-extending webs may support each baffle in spaced relation to the wall of the through hole. Annular plates may be arranged over opposite sides of the wheel to define air flow openings to and exhaust openings from the through-holes.

5 Claims, 20 Drawing Figures

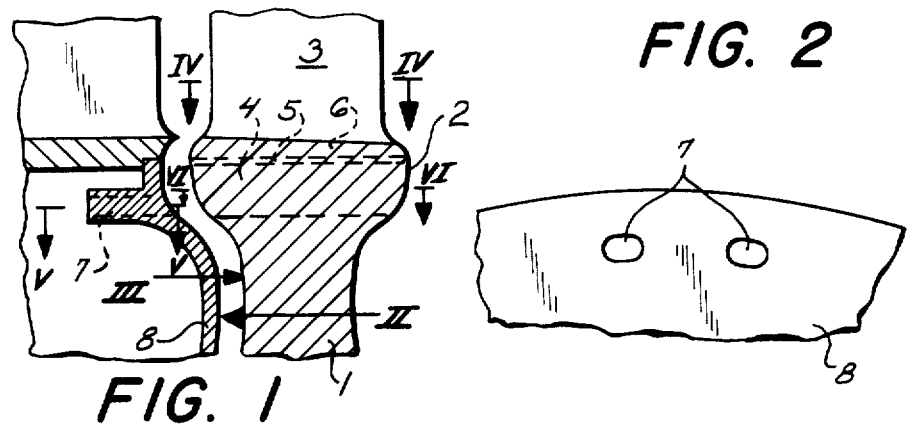
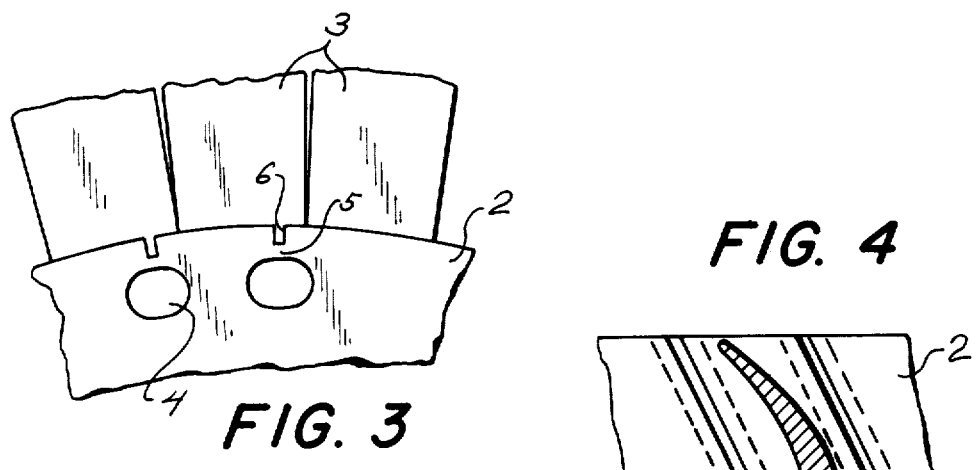

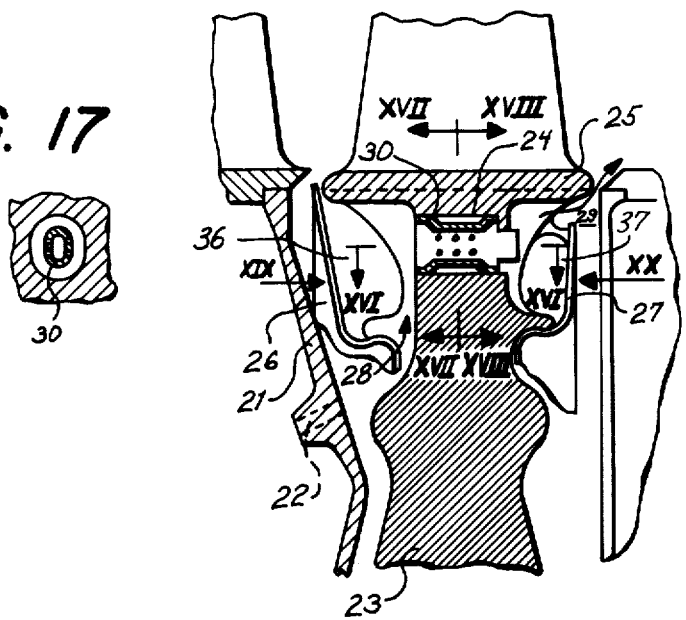
FIG. 17   FIG. 18
FIG. 15
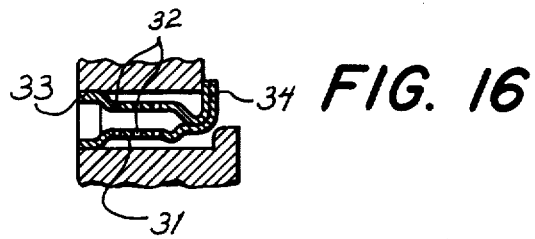
FIG. 16
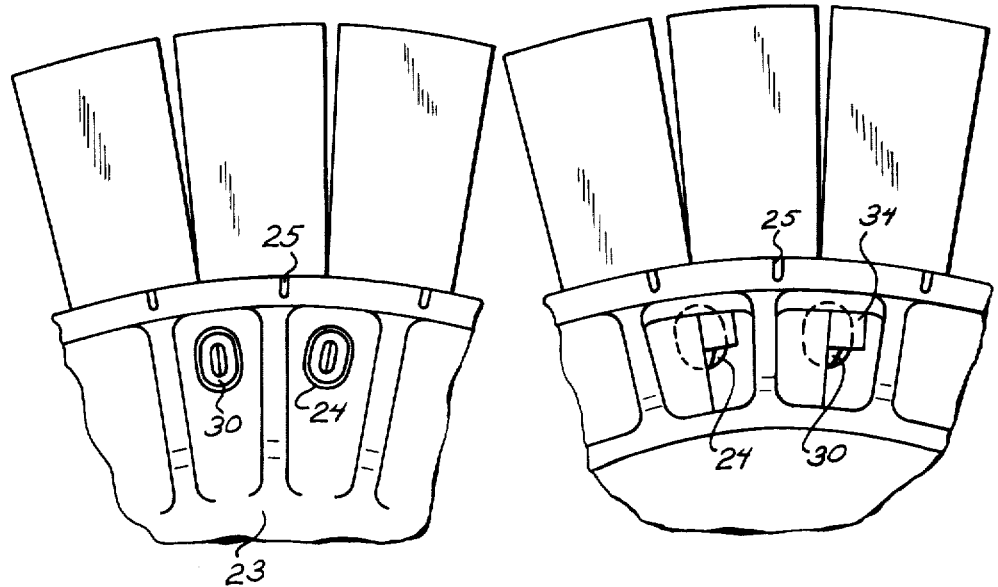
FIG. 19   FIG. 20

TURBINE WHEEL HAVING INTERNALLY COOLED RIM AND RATED BREAKING POINTS

The present invention relates to an air-cooled turbine stage comprising a turbine wheel wherein the rim and the blades are manufactured from one piece, and wherein the outer portion of the rim is formed with rated breaking points between the blade roots for thermal cracks at the end of slots, and which incorporate through-holes which locally disrupt the unitary disc-to-rim construction axially across the full width, the through-holes being sealed to prevent the flow of hot gases through them.

In known turbine wheels the through-holes serve to reduce the centrifugal mass and to stop cracks in the rim. For the latter purpose, the through-holes are first carried clear through the wheel but are then sealed to prevent the passage of hot gas and, thus, overheating in service. These known turbine wheels, however, have no provision for internal cooling and can be cooled only on the surface, so that they are not suitable for elevated and maximum turbine inlet temperatures. Subsequent sealing of the through holes and of the rated breaking points and slots requires additional effort and attendant cost. Also, the holes cause high losses as a result of windage. The fracture surfaces ensure cracking without fail, nor are they easy to size. As a result, they may not break open in their entirety, causing imbalance of the wheel, irregular vibrations of the blades, and ultimately even blade fractures.

In a broad aspect, the present invention provides a cooled turbine wheel which at minimum cooling air flow gives intensive cooling for process temperatures higher than currently practiced, which affords greater safety and flexibility in power control by introducing controlled and, at the time of initiation, fully matured cracks in the rim, and which still provides ease, economy, and simplicity of manufacture.

In a further aspect, the present invention attenuates the blade vibrations and thus extends the life of the turbine wheel.

It is a particular object of the present invention to provide a turbine wheel wherein the through-holes are prismatic in shape (i.e., have a shape which would be formed by linear movement of a surface completely surrounded by a line of any desired shape), are very close to the outside of the rim and establish communication for flow between the high-pressure side and the low-pressure side, and wherein the notches used to form the rated breaking points between the blade roots are formed directly on the outer surface of the rim, in parallel with and directly above the through-holes with only a very narrow and accurately sized rated breaking point remaining between the notch and the through-hole.

Establishing communication in this manner for flow between the high-pressure side and the low-pressure side makes for intensive cooling of the turbine wheel in that the heat coming from the radially outer areas is stopped very close to the point of penetration, leaving the inner wheel portions relatively cool and adding to the strength and/or life. The particular combination of the notches with intensively cooled through-holes produces a small, accurate surface of the rated breaking point which is easy to manufacture and which gets brittle during cooling fast enough to break open upon the very first severe thermal shock. This arrangement further permits the location of the rated breaking point to be defined better than for known turbine wheels of a similar type. This configuration also raises the allowable turbine inlet temperature and, thus, the economy of the engine and makes for a less costly and more reliable turbine wheel. The wheel is more reliable chiefly because a turbine wheel having evenly spaced and entirely cracked rated breaking points is more reliable and of longer life than a wheel wherein the cracks in the rim are few and sporadic. The rated notches also provide better attenuation of the blade vibrations for all blades, which again adds to life and reliability.

In addition, rated notches which are completely cracked before consistent service commences keep the turbine wheel from developing imbalance in service, and prevent undampened blade vibrations from impairing the strength of the blades.

In a further aspect of the present invention, the cooling air is forced into the through-holes through a plurality of air holes disposed in circular arrangement on the high-pressure side opposite the through-holes. In this arrangement, the direction of the air holes is in a plane approximately parallel to the axis such that the cooling air issues at an angle relative to the turbine centerline and at rated conditions enters the prism-shaped through-holes without shock.

This makes it possible to aim the cooling air more sharply into the through-holes, to improve the cooling effect by the high velocity of the incoming air, and to reduce the cooling air requirement without lowering the cooling efficiency. Entry of the cooling air without shock will, moreover, reduce the total pressure losses of the cooling medium.

In a further aspect of this invention, the prism-shaped through-holes are provided with tubular baffles sized and arranged such that an approximately consistant gap remains between the walls of the through-holes and the baffles over their entire length. The inner cross section of each baffle is blocked by a thin partition at approximately the mid-point of its length, and the baffles are formed with a plurality of radial holes in their tubular walls.

These tubular baffles serve to first direct the cooling air into the prism-shaped through-holes and then blow it, through the radial holes, on to the walls of the through-holes where the effect of impact again intensifies the cooling action. This will again reduce the cooling air requirements without diminishing the cooling effect.

In a further aspect of the present invention, the prism-shaped through-holes may have a circular cross section. These circular holes are very easy to produce and they also permit the use of baffles having a circular cross-section.

In a further aspect of the present invention, the prism-shaped through-holes may be oval, perhaps elliptical, in cross section. While such holes will require oval baffles, they will improve the stress pattern around the through-holes over that associated with circular holes.

In a further aspect of this invention, the gap between the baffle and the wall of the through-hole is preferably maintained by three longitudinal webs spaced evenly around the baffle for each through-hole. These webs are inexpensive and simple to produce, and apart from radial fixation they will permit the baffles to be located axially as well by bending their ends.

In a further aspect of this invention, the webs form part of the baffles. While this makes the baffles a little more difficult to produce, it still reduces the number of detail parts and alleviates stocking problems.

In a further, alternative, aspect of the present invention, the webs form part of the walls of the through-holes, as when they are made in one piece with the walls. While this makes it more difficult to produce the through-holes, although this would be not a great problem for EDM (electro-discharge machining), it does simplify the production of the baffles.

In a further aspect of the present invention one of the webs directly contacts the rated breaking point. This will prevent the penetration of external gas into the through-holes.

In a further aspect of this invention:
1. the rim of the turbine wheel is in part supported by a number of ribs corresponding to the number of blades, which ribs extend radially between the rim and the disc on the two disc faces and are in turn covered by two annular discs on their outer sides; one of the discs is arranged on the high-pressure side to provide a port between its inner edge and the turbine disc for the admission of cooling air, while the other disc is arranged on the low-pressure side to provide a port between its radially outer rim and the turbine disc for exhausting the cooling air,
2. the through-holes extend in parallel with the axis and are oval-shaped, and
3. the gaps between the oval through-holes and the baffles are maintained with the aid of flared portions at the two axial ends of the baffles and the baffles are sealed and axially located at their low-pressure ends by means of bent tabs.

Incorporation of the ribs considerably cuts the weight of the turbine wheel and reduces the thickness of the disc, while the particular arrangement of the cover rings prevents windage and simultaneously raises the pressure gradient of the cooling air, again improving the cooling action for superior economy. The thinned disc permits the through-holes to be shorter and, thus, less costly to produce than their longer counterparts, and the through-holes can be incorporated in a direction parallel with the axis, which likewise affords economy in manufacture. The oval shape of the through-holes more readily conforms to the space between the ribs and improves the stress pattern around the through-holes.

Further objects and advantages of the present invention are described in connection with the accompanying drawings, in which:

FIG. 1 is a fragmentary sectional view and illustrates a turbine stage arranged in accordance with the present invention, wherein a prism-shaped through-hole arranged at an angle with the sectional plane, the associated rated notch, and the cooling air nozzle are all shown in broken lines;

FIG. 2 is a view in the direction of arrow II in FIG. 1, and illustrates part of the turbine stage stator formed with cooling air nozzles;

FIG. 3 is a view in the direction of arrow II in FIG. 1, showing part of the turbine wheel formed with circular through-holes;

FIG. 4 is a sectional view of the turbine wheel taken along line IV—IV of FIG. 1;

FIGS. 5 and 6 are sections taken along line V—V (cooling air nozzles) and line VI—VI (through-holes), respectively, showing a velocity vector diagram for shock-free entry of the cooling air into the through-holes;

FIG. 15 illustrates a further embodiment of a turbine stage, in longitudinal section;

FIG. 16 is a sectional view taken along line XVI—XVI of FIG. 15;

FIG. 17 is a sectional view taken along line XVII—XVII of FIG. 15;

FIG. 18 is a sectional view taken along line XVIII—XVIII of FIG. 15;

FIG. 19 is a detail view in the direction of arrow XIX in FIG. 15, with the cover ring removed; and FIG. 20 is a detail view in the direction of arrow XX—XX in FIG. 15, again with the cover ring removed.

Figure 7:
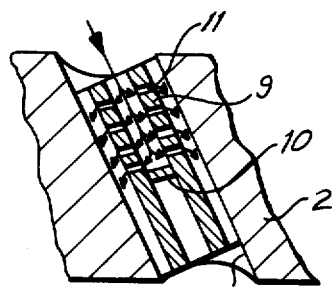
FIG. 7 is a longitudinal section through a cylindrical through-hole and baffle.

FIG. 1 is a sectional view of a turbine wheel essentially consisting of a disc 1, a rim 2, and blades 3. For clarity, a through-hole 4, arranged in accordance with the present invention and here represented by a drilled passage, a rated breaking point 5, and a radial slot 6 are all indicated by broken lines. Cooling air issuing from holes 7 in stator 8 is forced directly into the through-holes 4.

The side of the stator 8 facing the turbine wheel is shown in FIG. 2, while FIG. 3 illustrates the high-pressure side of the turbine wheel. FIG. 4 (a section taken along line IV—IV) is a view of the radially outer side of the turbine wheel and indicates in solid lines a notch 6 which approximately follows the blade contours and, in broken lines, the through-hole under it.

The mutually related FIGS. 5 and 6 show a developed sectional view of the cooling air holes 7 in stator 8 and of the through-holes 4. The direction of the through-holes 4 is governed by the blades, whereas the direction of the holes 7 is controlled by the velocity vector diagram, i.e., by the exhaust velocity c, the peripheral velocity U of the turbine wheel at this point, and the direction of the through-holes 4. W representing the relative velocity between the cooling air and the wheel 2.

Cooling is improved by the use of tubular baffles 9, one of which is shown in FIG. 7. The free exit of cooling air in the interior of the tubular baffle in the aft direction is prevented by a partition 10, compelling the air to issue through radial holes 11 and impinge upon the inner walls of the through-holes 4 for particularly effective cooling.

Figure 14:
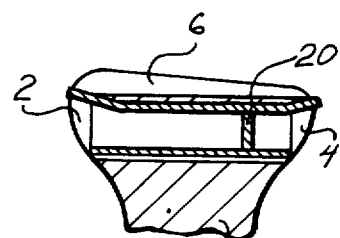
FIG. 14 is a longitudinal section and illustrates a cylindrical through-hole having a baffle with its partition moved aft.

A similar embodiment is shown in FIG. 14, except that the partition 20 is placed farther to the rear.

Figure 8:
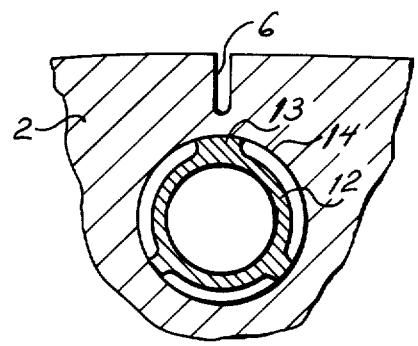
FIG. 8 is a cross-section and illustrates a circular through-hole accommodating a one piece baffle and web.

One particular embodiment (FIG. 8) includes circular through-holes 14 with tubular baffles 12 having webs 13 on the outside.

Figure 9:
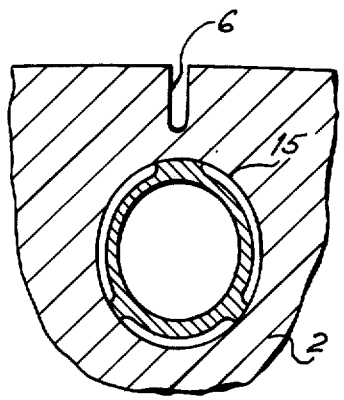
FIG. 9 is a cross-section and illustrates an oval through-hole accommodating a one piece baffle and web.

A similar embodiment, except with an oval through-hole 15 and matching baffles is shown in FIG. 9.

Figure 10:
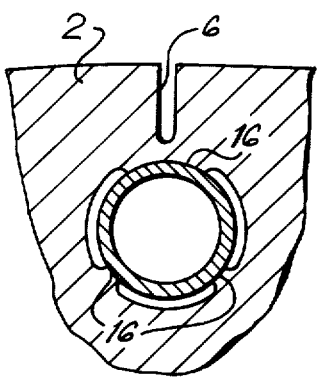
FIG. 10 is a cross-section and illustrates a circular through-hole in which the webs form part of the wall of the hole.
Figure 11:
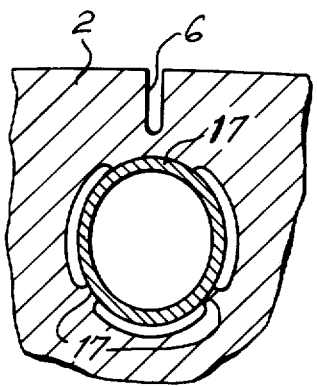
FIG. 11 is a cross-section and illustrates an oval through-hole in which the webs from part of the wall of the hole.

Two further embodiments similar to the two just described are shown in FIGS. 10 and 11, except that the webs 16 and 17, respectively, are formed integral with the walls of the through-holes.

Figure 13:
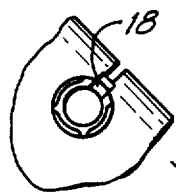
FIG. 13 is a view of the fixing means in direction of arrow XIII in FIG. 12.
Figure 12:
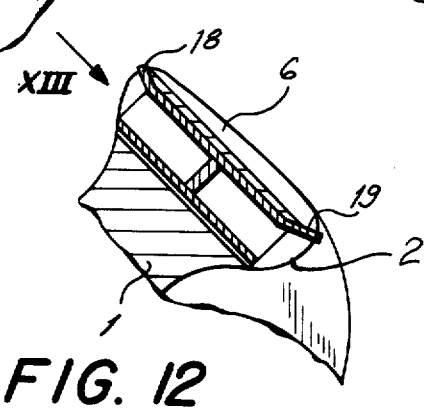
FIG. 12 shows axial fixation of a baffle by tabs to prevent sliding with respect to the through-hole.

FIGS. 12 and 13 illustrate the axial fixation of a tubular baffle, where two tabs 18 and 19, one at either end of a baffle, are bent upwards into matching milled recesses at the ends of the through-hole.

FIGS. 15 to 20 illustrate a further development of the turbine stage arranged in accordance with this invention. Shown in a section taken longitudinally of the turbine stage is the stator 21 having passageways 22 through which the cooling air is forced to a point or rotor 23 located a little farther towards the exterior radially. The rotor disc being rather slim at the transition to the rim, slanted through-holes are here omitted and instead through-holes 24 are used extending parallel to the rotor axis.

This can be achieved, however, only because radially arranged ribs, extending inwardly between the through-holes and essentially tapering off in the direction of the disc, are used to support the laterally projecting portions of the rim. In order to prevent windage from these ribs and to increase the pressure gradient of the cooling air flowing through the turbine wheel, use is made of disc-shaped rings 26 and 27 over the two faces of the disc. An annular high pressure chamber 36 is defined between ring 26 and disc 23, and an annular low pressure chamber 37 is defined between ring 27 and disc 23. A passage 28 into chamber 36 is provided on the high-pressure side between the inner edge of the ring 26 and the disc, and a passage 29 out of chamber 37 is provided on the low-pressure side between the outer edge of the ring 27 and the rim, for entry and exit, respectively, of the cooling air.

The longitudinal slots 25 (shown in broken lines in FIG. 15) still follow the contours of the blades and extend between them at an angle, and the slots pass directly above the through-holes which for stress considerations preferably have an oval shape.

The baffles 30 are manufactured from sheet metal, and they serve to intensify cooling in the through-holes by exploiting the effect of impact. For this purpose their central portion 31 is shaped to provide a sufficient space between the baffle and the walls of the through-hole to blow cooling air, through holes 32, against the walls of the through-hole.

The high-pressure end 33 of the baffles is flared for a snug fit all around the inner wall of the through-hole to provide fixation. The low-pressure end 34 of the baffle is flattened and bent to prevent cooling air from escaping from its interior and to keep the baffle from slipping axially.

What is claimed is:

1. A turbine wheel comprising:
   a. a disc including a central portion and a rim portion around the periphery of said central portion, and blades spaced apart around the periphery of said rim portion,
   b. a plurality of through holes in said disc spaced apart circumferentially, said holes providing communication for cooling air flow between the opposite sides of the turbine wheel,
   c. cooling air flow guide means on each side of the disc, said guide means defining a high pressure chamber on one side of said disc and a low pressure chamber on the opposite side of said disc, both of said chambers communicating with said through holes, and said guide means defining an entry passage through which cooling air can flow into said high pressure chamber and an exit passage through which cooling air can flow out of said low pressure chamber, said entry passage being located radially inwardly of said exit passage, and
   d. a generally tubular baffle in each of said through-holes, said baffle being spaced from the wall of said through-hole along at least a portion of the length of the baffle, said baffle being open at its end facing said high pressure chamber to receive cooling air therefrom, means for preventing flow of air to the other end of the baffle, and a plurality of holes in the wall of the baffle for directing cooling air radially against the wall of the through-hole, said baffles being flared at their opposite ends to maintain a spacing between the remainder of each baffle and its respective through hole wall, and said means for preventing flow of air being a bent tab arranged at the closed end of each baffle, said tab preventing axial movement of said baffle within its respective through hole,
   e. in combination with a stator at one side of the turbine wheel, said stator having a series of passageways through which cooling air flows toward the through holes in the turbine wheel.

2. A turbine wheel as defined in claim 1 wherein each of said guide means is a disc-shaped ring fixed to said disc.

3. A turbine wheel as defined in claim 1 including radially extending ribs on both faces of said disc.

4. A turbine wheel as defined in claim 2 wherein the radially inner edge of one of said rings defines said entry passage, and the radially outer edge of the other of said rings defines said exit passage.

5. A turbine wheel as defined in claim 1 wherein said rim portion and blades are made from one piece, and including a notch in the peripheral surface of said rim portion between each two successive blades, each notch being parallel to one of said through holes, and each notch and its respective through hole being spaced close together to define a narrow rated breaking point between them.

* * * * *